INVENTOR
Gerd von Bennigsen
BY Michael S. Striker
his ATTORNEY

Feb. 2, 1965  G. VON BENNIGSEN  3,167,812
APPARATUS FOR CONTROLLING THE TEMPERATURE OF
PLASTIC MATERIAL IN AN EXTRUDING MACHINE
Filed July 28, 1961  3 Sheets-Sheet 2
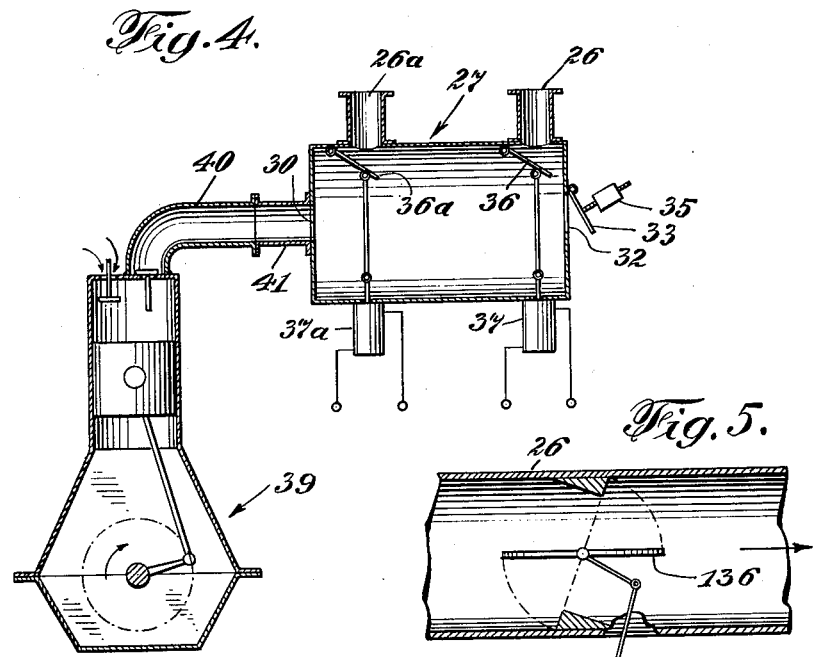
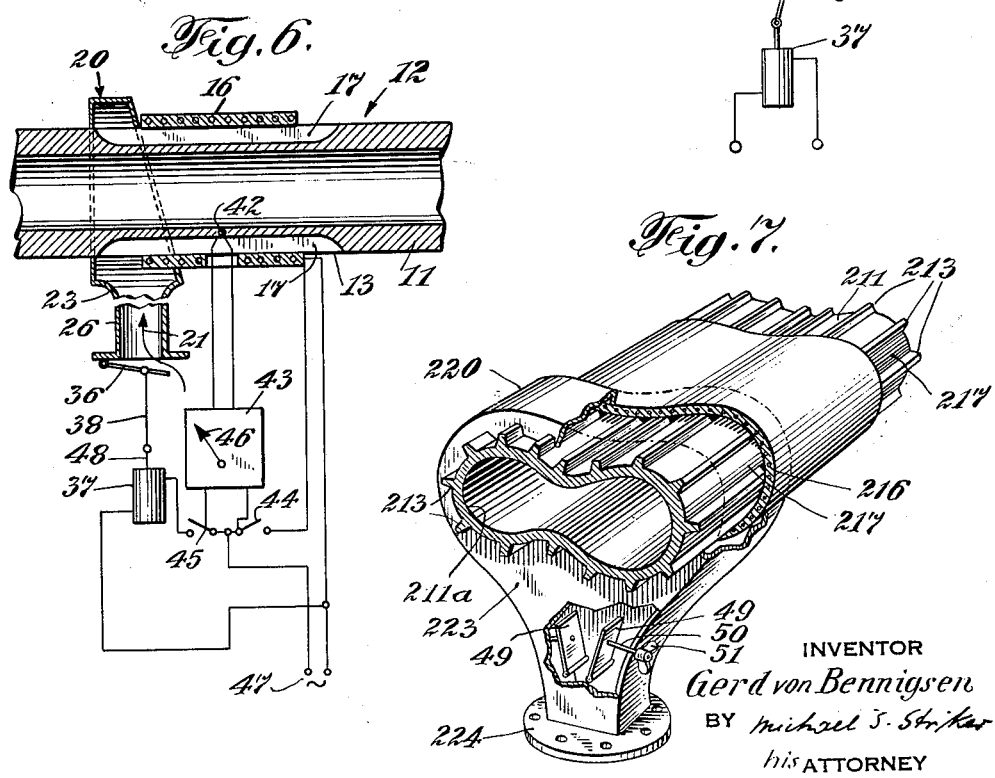
INVENTOR
Gerd von Bennigsen
BY Michael J. Striker
his ATTORNEY

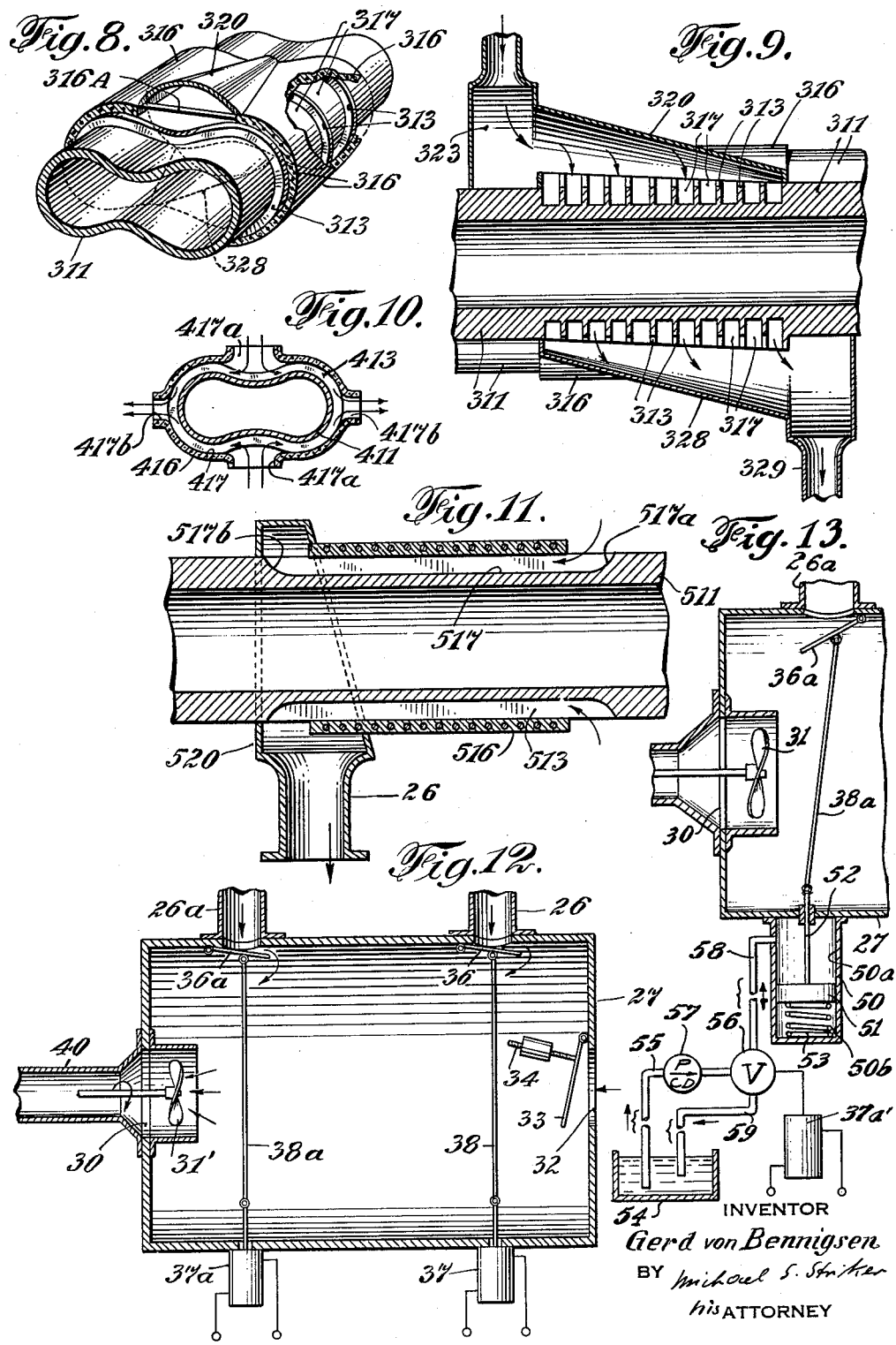

United States Patent Office 3,167,812
Patented Feb. 2, 1965

3,167,812
APPARATUS FOR CONTROLLING THE TEMPERATURE OF PLASTIC MATERIAL IN AN EXTRUDING MACHINE
Gerd von Bennigsen, Geisenbrunn, Post Gilching, Germany, assignor to Krauss-Maffei Aktiengesellschaft, Munich-Allach, Germany
Filed July 28, 1961, Ser. No. 127,731
9 Claims. (Cl. 18—12)

The present invention relates to improvements in machines for continuous extrusion of plastic material. More particularly, the invention relates to improvements in the cooling and heating arrangements for extrusion machines.

In an extrusion machine, the temperature of the cylinder which contains the material advancing member, e.g. a single screw or a twin screw, must be maintained just below the decomposition temperature of the plastic material. As a rule, the temperatures prevailing in the cylinder are just a few degrees below the decomposition temperature. This insures optimum strength and uniformity of the extruded product and enables the machine to operate at full capacity. In order to insure that the temperature remain within a predetermined narrow range, certain zones of the machine must be heated or cooled to different temperature. Thus, the temperature at the material admitting end of the cylinder is different from the temperature at the discharge end or in the intermediate zones of the cylinder. Consideration must be given to heat energy developing as a result of friction of plastic material advancing in the cylinder, and the characteristics of the material also play an important role in the generation and regulation of heat. In some instances, the compression and/or plastification of material takes place with the help of externally admitted heat, whereas in certain other instances heat energy must be withdrawn by subjecting selected zones of the cylinder to the action of a suitable liquid or gaseous coolant.

Accordingly, it is an important object of the present invention to provide a novel cooling and heating arrangement in machines for the extrusion of plastic material which is characterized in that the supply of heat and/or coolant may be adjusted automatically so as to conform to the momentary heat requirements of the machine.

Another object of the invention is to provide an arrangement of the just outlined characteristics which is capable of immediately adjusting the temperature of plastic material so as to positively prevent any burning or decomposition of plastic material or a reduction in the output and an increase in power requirements of the extrusion machine.

A further object of the instant invention is to provide an extrusion machine embodying a combined cooling and heating arrangement wherein a single source of coolant may supply all coolant necessary for properly regulating the temperature of the cylinder, wherein the cooling action in each selected zone of the cylinder may be regulated with utmost accuracy, and which need not utilize a source of coolant whose power requirements would exceed an economically justifiable magnitude.

An additional object of the invention is to provide an arrangement of the above outlined characteristics which is constructed and assembled in such a way that spent coolant cannot impede or inconvenience the operators in the performance of their duties, and wherein the coolant remains in short-lasting contact with the cylinder so that the spent coolant will not attain a dangerously high temperature.

Still another object of my invention is to provide a specially constructed cooling arrangement whose dimensions may remain comparatively small despite the fact that it can always supply requisite quantities of coolant even if the coolant requirements of the machine vary within a very wide range.

An additional object of the invention is to provide an extruding machine wherin the consumption of heat energy is substantially lower than that of any extruding machine having the same output as far as I am aware at this time.

With the above objects in view, the invention resides in the provision of an extrusion machine which comprises an elongated extrusion cylinder having a longitudinal extension and a transverse extension substantially perpendicular to the longitudinal extension, one-piece or composite tubular heating means disposed about and defining with the cylinder a plurality of separate channels which are disposed in planes parallel with one extension of the cylinder, and means for conveying a coolant through the channels. Since the channels are located in planes parallel with the longitudinal extension (i.e. with the longitudinal axis) of the cylinder or with the transverse extension of the cylinder, the coolant passing therethrough covers comparatively short distances while advancing from the intakes to the outlets of the separate channels and, therefore, rapidly changes the temperature in the corresponding zone of the cylinder. The coolant may be admitted to the channels from a suitable source of compressed coolant or, alternatively, the coolant may be conveyed by suction through the channels, e.g. by connecting the outlets of the channels with a receiver or tank provided with a suction fan or the like.

Certain other features of the invention reside in the provision of thermoelements and adjustable relays for controlling the flow of coolant and for controlling the action of the heating means, in the special construction of the coolant source, in the provision of specially constructed coolant admitting and withdrawing hoods which close the intakes and/or the outlets of the channels, in the provision of specially constructed valves which regulate the flow of coolant into and from the source and into and from the conveying means which connect the source with the intakes of the channels, and in the provision of two or more groups of cooling channels in the extrusion cylinder.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 4 is a somewhat schematic sectional view of a modified cooling arrangement for the extrusion machine;

FIG. 5 is an enlarged fragmentary sectional view of a modified shutoff valve for a supply duct which forms part of the cooling arrangement;

FIG. 6 is a fragmentary axial section through the cylinder of a single- or twin-screw extrusion machine showing an electric circuit including a thermostat-controlled relay for regulating the heating and cooling arrangements of the machine;

FIG. 7 is a fragmentary perspective view of a cylinder forming part of a twin-screw extrusion machine, with certain elements partly broken away;

FIG. 8 is a fragmentary perspective view of the cylinder forming part of a modified twin-screw extrusion machine, showing different coolant-admitting and coolant-withdrawing means;

FIG. 9 is an enlarged central section through the cylinder of FIG. 8;

FIG. 10 is a transverse section through the cylinder of a different twin-screw extrusion machine, showing a different arrangement of cooling channels;

FIG. 11 is an axial section through the cylinder of an extrusion machine wherein the coolant is sucked through the cooling channels;

FIG. 12 is an axial section through a tank which is provided with a suction fan to draw air through the cooling channels of the extrusion cylinder; and FIG. 13 is a fragmentary sectional view of a tank which is provided with a fluid-operated servomechanism for opening and closing the valves which permit or prevent the flow of coolant through the cooling channels.

Figure 1:
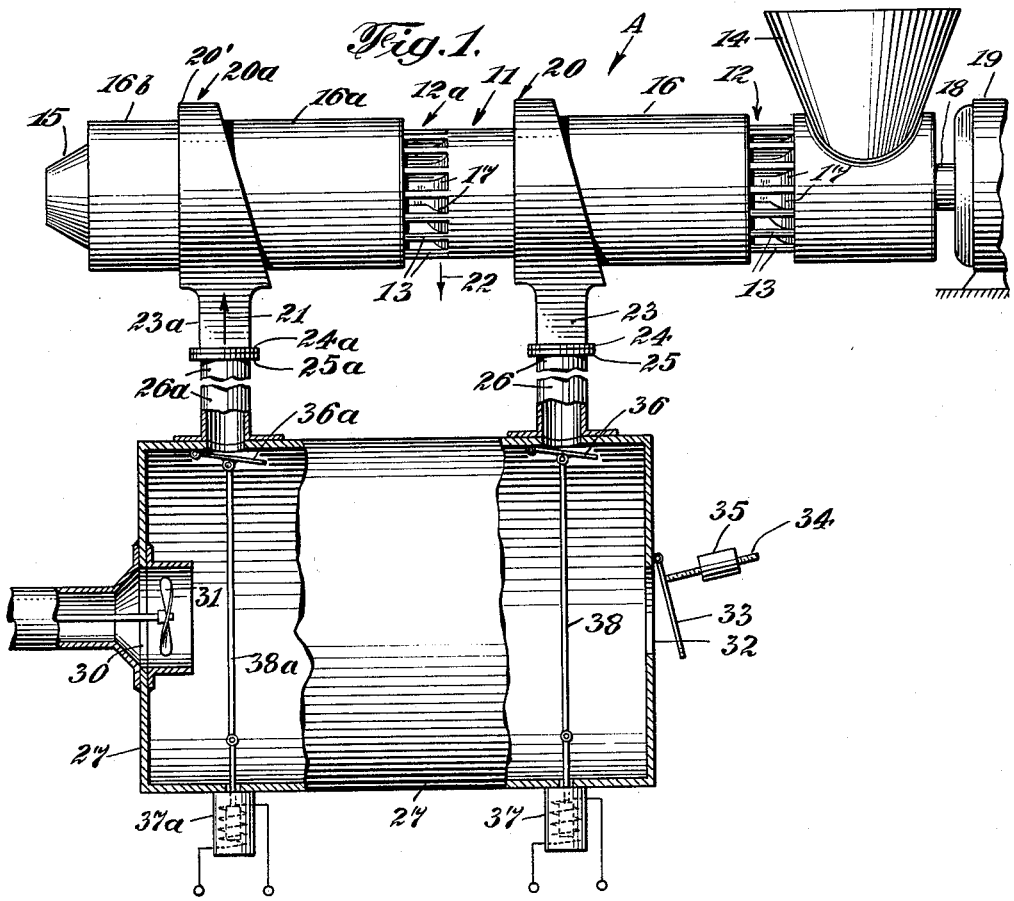
FIG. 1 is a partly elevational and partly sectional view of a single- or twin-screw extrusion machine embodying one form of the invention.
Figure 2:
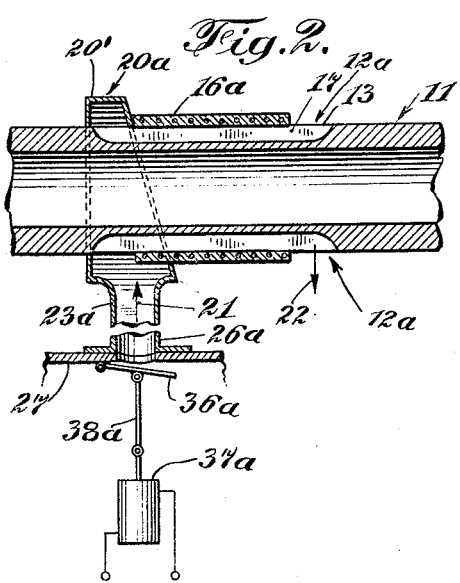
FIG. 2 is a fragmentary axial section through the cylinder of the extrusion machine shown in FIG. 1.

Referring now in greater detail to the illustrated embodiments, and first to FIGS. 1 and 2, there is shown an extrusion machine A which comprises an elongated extrusion cylinder 11 formed with two groups 12, 12a of external axially parallel cooling fins or ribs 13. The right-hand group 12 of fins 13 is adjacent to a material admitting means in the form of a hopper 14 through which a plastic material in granular, powdered or other suitable form is introduced into the machine, and the left-hand group 12a of fins is adjacent to an extrusion die 15 having a suitably configured and dimensioned orifice through which the plasticized material is continuously discharged in the form of an elongated shaped article. The fins 13 in the groups 12, 12a are preferably equally spaced from each other. The group 12 is surrounded by a tubular electric heating means in the form of a band 16 whose axial length is less than the axial length of the fins 13 in this group so that the longitudinal ends of the separate channels 17 formed between the fins 13 and the heating means 16 remain exposed. The channels 17 are parallel with the longitudinal extension, i.e. with the longitudinal axis of the cylinder 11 and their exposed ends respectively constitute the intakes and the outlets for a cooling fluid. A similar heating means 16a surrounds the fins of the group 12a. A third heating means 16b is provided about the forward end of the extrusion cylinder 11 adjacent to the die 15. That portion of the cylinder 11 which is surrounded by the heating means 16b normally need not be cooled. The cylinder 11 receives a screw 18 which is driven by an electric motor 19. The heating means 16, 16a, 16b are respectively connected to separate sources of electrical energy, not shown in FIGS. 1 and 2, so that the sections of the cylinder 11 surrounded by the respective heating means may be heated to different temperatures. The heating means 16b surrounds the maximum-temperature zone of the extrusion cylinder while the heating means 16, 16a surround two intermediate zones through which the plastic material admitted through the hopper 14 must pass on its way toward the die 15 to be completely plasticized before being discharged through the extrusion orifice.

It will be readily understood that the number of heating means may be reduced or increased, depending on the nature of the plastic mass, on the dimensions of the cylinder 11, and on certain other factors. For example, the cylinder 11 may be provided with as many as six or even more heating means. It is equally possible to provide only one group of fins 13 which then extend substantially all the way between the heating means 16b and the hopper 14. In such instances, the heating means 16, 16a may be replaced by a single heating means or by a series of tubular heaters arranged end-to-end. Each heating means comprises one or more elastic heating coils of any suitable design.

As shown in FIG. 2, the left-hand end portions of the fins 13 and the intakes of the channels 17 in the group 12a are surrounded by a coolant-introducing member 20a whereby the coolant, e.g. air, introduced through the member 20a (arrow 21) flows through the straight axially parallel channels 17 between the fins of the group 12a and is discharged through the outlets of these channels at the right-hand axial end of the heating means 16a in the direction indicated by the arrows 22. The member 20a assumes the shape of an annular hood which is axially traversed by the cylinder 11 and which is formed with a nipple 23a having a flange 24a connected with the similar flange 25a of a supply duct 26a, the latter extending radially from a source of coolant here shown as a cylindrical receiver or tank 27. A similar supply duct 26 is connected by flanges 25, 24 with the nipple 23 of a second coolant-introducing member 20 which surrounds the left-hand ends of the fins in the group 12, i.e. which is adjacent to the left-hand end of the heating means 16. The nipple 23 or 23a and the adjacent portion of the respective coolant-introducing member may assume the form of a funnel (FIG. 7) of constant axial length.

The circumferential walls 20' of the members 20, 20a are uniformly spaced from the respective fins 13 through about three-fourths of the periphery of the cylinder 11 and, in order to insure uniform distribution of coolant to each of the channels 17, the axial length of the members 20, 20a preferably diminishes gradually in a direction from the respective nipples 23, 23a toward the diametrically opposite side of the cylinder 11. In other words, the projection of each coolant-introducing member resembles a trapezoid as is clearly shown in FIGS. 1 and 2. Alternately, the radial distance between the walls 20' of the members 20, 20a and the respective fins 13 may decrease gradually in a direction from the respective nipples 23, 23a toward the diametrically opposite side of the cylinder 11. The parts 20, 26 and 20a, 26a respectively constitute a pair of means for conveying coolant from the source 27 to the intakes of channels 17 respectively defined by the heating means 16 and 16a.

It will be noted that the channels 17 are of large cross-sectional areas so that a coolant passing therethrough will immediately change the temperature of the respective cylinder zone. This insures that the changes in the temperature of conveyed plastic material in the plastic-admitting, plasticizing and extruding zones of the cylinder 11 are brought about with no delay whatsoever so as to protect the material against burning or decomposition while simultaneously insuring that the machine may be operated at full capacity.

Figure 3:
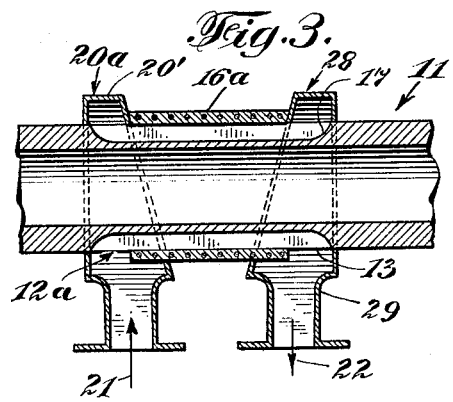
FIG. 3 is a similar fragmentary axial section through the cylinder of a slightly modified extrusion machine.

It is often desirable to prevent direct discharge of coolant into the surrounding atmosphere because the blasts of heated spent coolant may be a nuisance to the operators. In such instances, the coolant discharged through the outlets of the channels 17 may be caused to flow through a coolant collecting or withdrawing member 28 which is shown in FIG. 3. The member 28 surrounds the right-hand ends of the fins 13 in the group 12 and is adjacent to the heating means 16a so that it may collect all coolant discharged into the channels 17 by the member 20a. It will be noted that the members 20a, 28 are of identical shape but are disposed in mirror symmetry with respect to a plane which passes therebetween and is perpendicular to the axis of the cylinder 11. The nipple 29 of the member 28 may be connected to a flue or the like. The illustrated configuration of the member 28 insures that the stream of spent coolant is uniformly withdrawn from each of the channels 17 because the axial length of this member diminishes gradually at the same rate and in the same direction in which the axial length of the associated hood 20a diminishes.

Referring back to FIG. 1, one end wall of the tank 27 is formed with an opening 30 which accommodates a coolant introducing means in the form of a blower 31. The other end wall of the tank 27 is formed with an opening 32 which is controlled by a pivotably mounted adjustable flap valve 33. The pressure of coolant in the tank 27 is adjustable by an arrangement including a spindle 34 secured to and extending outwardly from the valve 33 and by a counterweight 35 which is turnably mounted on and is axially shiftable along the spindle 34 by an operator when it becomes necessary to change the pressure of the coolant. It will be readily understood that the spindle 34 and the counterweight 35 may be replaced by other pressure adjusting means such as an adjustable spring which may be mounted in a manner to bias the valve 33 with a given pressure against the right-hand end wall of the tank 27 so that the valve may permit escape of coolant from the tank 27 in response to a predetermined pressure in the tank.

The flow of coolant from the tank 27 to the supply ducts 26, 26a of the two coolant conveying means is controlled by two solenoid operated valves including valve members or flaps 36, 36a, solenoids 37, 37a and motion transmitting links 38, 38a, respectively. It is preferred to dispose the solenoids 37, 37a diametrically opposite the intake ends of the ducts 26, 26a. The valve members 36, 36a permit or prevent the flow of coolant to the members 20, 20a in dependency on the temperatures momentarily prevailing in the corresponding zones of the cylinder 11, i.e. in zones respectively surrounded by the heating means 16 and 16a.

The arrangement is such that, when actuated by the respective links 38, 38a, the valve members 36, 36a permit unobstructed flow of coolant from the tank 27 into the ducts 26, 26a so that the cooling of the cylinder 11 takes place with no delay whatever and that large quantities of coolant may flow through the short channels 17 to rapidly reduce the temperatures prevailing in the respective cylinder zones. As stated above, the comparatively short channels 17 define two composite passages of large cross-sectional areas to insure that large quantities of coolant may flow through each passage and that the cooling action is practically instantaneous.

FIG. 4 shows a slightly modified cooling arrangement wherein the means for introducing coolant to the tank 27 comprises an air compressor 39 having its discharge conduit 40 connected with a nipple 41 which sealingly surrounds the opening 30. The exact construction of the compressor 39 forms no part of my present invention.

Referring to FIG. 5, there is shown a butterfly or wing throttle valve 136 which is mounted in the supply duct 26 as a substitute for the valve members 36. A similar valve may be installed in the duct 26a. The linkage 38 between the valve 136 and its solenoid 37 may be the same as that shown in FIGS. 1 and 4. In the full-line position of FIG. 5, the valve 136 permits substantially unobstructed flow of coolant through the duct 26.

FIG. 6 shows a complete circuit for the heating means 16 and for the solenoid operated valve member 36. This circuit comprises a thermoelement 42 which senses the temperature prevailing in that zone of the cylinder 11 which is surrounded by the heating means 16 and a relay 43 controlled by the thermoelement 42 and in turn controlling switches 44 and 45. The relay 43 may be set to a predetermined temperature which is indicated by the pointer 46. When the temperature in the corresponding zone of the cylinder 11 drops below the selected temperature, the relay 43 closes the switch 44 and thereby completes the circuit of the heating means 16 by connecting the heating means with the current source 47. When the temperature in the cylinder 11 rises beyond the selected temperature, the relay 43 opens the switch 44 and closes the switch 45 to complete the circuit of the solenoid 37 whereby the latter attracts its core 48 and fully opens the valve member 36 to permit substantially unobstructed flow of coolant to the channels 17. The arrangement may be such that the relay 43 automatically opens the switch 44 when it closes the switch 45, or vice versa.

It will be noted that the thermoelement 42 is immediately adjacent to a channel 17 of large cross-sectional area so that the thermoelement can immediately sense a drop in temperature caused by the coolant flowing through the channel and operates the relay 43 accordingly. In other words, the admission of coolant is started or terminated immediately when the temperature in the corresponding zone of the cylinder 11 respectively rises beyond or drops to the value selected by the setting of the relay 43.

FIG. 7 shows a modified cylinder 211 whose bore 211a may receive two material advancing screws, not shown. This cylinder is again formed with external axially parallel fins 213 which are partially surrounded by a strap-shaped tubular heating means 216 to form with the latter a series of separate axially parallel channels 217. The intakes of these channels are surrounded by an annular substantially heart-shaped coolant introducing member or hood 220 which is formed with a nipple 223 terminating in a flange 224 connectable to the flange 25 of the supply duct 26 shown in FIG. 1. The nipple 223 accommodates a pair of coolant-distributing valves in the form of flaps 49 which are pivotally mounted therein and may be adjusted from the outside by spindles 50 and wing nuts 51 to regulate the flow of coolant from the source to the channels 217. The purpose of the flaps 49 is to insure more uniform distribution of coolant to each of the channels 217. It will be noted that the fins 213 extend beyond the hood 220 and that the end walls of this hood sealingly engage with the outside of the heating means 216 as well as with the walls of the individual channels so as to seal the intakes of the channels from the surrounding atmosphere. Again, the channels 217 extend in planes which are parallel to the longitudinal extension, i.e. to the longitudinal axis of the cylinder 211, i.e. the coolant covers the shortest possible distance while advancing from the hood 220 to the outlets of the channels at the right-hand axial end of the heating means 216.

FIGS. 8 and 9 show a further modification of the invention according to which the twin-screw cylinder 311 is formed with annular fins 313 disposed in planes parallel with the transverse extension which is perpendicular to the longitudinal extension of the cylinder. A selected zone of the cylinder 311 is surrounded by a heating means 316 which comprises a plurality of electric heating coils and which is formed with a first aperture closed by a modified coolant admitting member 320 and with a second aperture for a coolant evacuating member 328, the latter located diametrically opposite the member 320. As shown in FIG. 9, the members 320, 328 communicate with each of the annular channels 317 defined by the fins 313 and the heating means 316 so that a coolant introduced through the member 320 will be divided into two streams and will flow in opposite directions about the cylinder 311 to be discharged through the members 328. The member 320 communicates with a supply duct 323, and the member 328 is connected with a flue 329.

It will be noted that the shape of the members 320, 328 resembles the shape of gutter tiles, i.e. each of these members resembles one-half of a hollow truncated cone. These members actually divide the heating means 316 into two sections or halves which respectively extend between the opposite sides of the members 320, 328 so that each half of the heating means assumes a semiannular shape. The two halves of the heating means are connected with each other by elastic straps 316A, by turnbuckles or the like. The coolant introduced at 323 flows through the channels 317 in planes which are parallel with the transverse extension of the cylinder 311 and is thereupon discharged at 329.

FIG. 10 illustrates an extrusion cylinder 411 which is again formed with annular fins 413 and is surrounded by a composite heating means 416 consisting of four angularly spaced arcuate sections defining with the fins 413 channels 417 located in planes parallel with the transverse extension of the cylinder. In addition, the sections of the heating means 416 define between themselves two intakes 417a and two outlets 417b for the channels 417. It will be noted that the pairwise arranged intakes 417a and outlets 417b are respectively formed at diametrically opposite sides of the cylinder 411. The coolant admitted through the intakes 417a is divided into two streams flowing about the periphery of the cylinder 411 and escaping through the outlets 417b. The inlets and the outlets extend through the full axial length of the heating means 416.

The source of coolant, the various valves and the electric circuits for the cylinders shown in FIGS. 7–10 are the same or analogous to those described in connection with FIGS. 1–6. It will be noted that the cross-sectional areas of the annular channels 217, 317, 417 are rather large which insures that large quantities of coolant passing therethrough will rapidly change the temperature of the cylinder.

Referring to FIG. 11, there is shown a modified extrusion machine whose cylinder 511 is formed with axially parallel fins 513 and is surrounded by a tubular heating means 516 defining with the fins a series of axially parallel channels 517. The intakes 517a of these channels communicate with the atmosphere, and the outlets 517b are surrounded by an annular coolant collecting member 520 whose nipple 26 conducts spent cooling air to the tank 27 of FIG. 12 after the air has passed through the intakes 517a, through the channels 517 and through the outlets 517b.

FIG. 12 illustrates a coolant arrangement which is utilized in connection with the extrusion cylinder 511 shown in FIG. 11. The air introducing blower 31 of FIG. 1 is replaced by a suction producing fan 31' which draws coolant (air) from the tank 27 and hence from the supply ducts 26, 26a when the valve members 36, 36a are open. The adjustable valve 33 is disposed in the tank 27 and opens automatically when the valve members 36, 36a are closed but the fan 31' rotates, i.e. this valve admits air through the inlet opening 32 in response to a predetermined subatmospheric pressure in the tank 27. The hood 520 and the non-illustrated second hood which is connected with the duct 26a serve as a means for withdrawing atmospheric air from the outlets 517b at the left-hand ends of the respective channels 517, the air entering through the intakes 517a at the right-hand ends of the channels 517, as viewed in FIG. 11, then flowing through the channels, through the hoods, through the conveying ducts 26, 26a into the tank 27 and being evacuated by the suction fan 31'. The cooling arrangement of FIG. 12 may operate without the members 28 shown in FIG. 3 and without the members 328 shown in FIG. 9 because the pipe 40 may be connected to a flue or the like and the air drawn into the channels is fully controlled while flowing to the fan 31'.

FIG. 13 illustrates a further modification of my invention according to which the valve member 36a is movable between its fully open and closed positions by an arrangement including a motion transmitting link 38a, a servomotor including a cylinder 50, a piston 51 whose piston rod 52 is articulately connected with the link 38a, a spring 53 which is mounted in the lower chamber 50b of the cylinder 50 and which permanently biases the piston 51 in a direction to move the valve member 36a to its closed position, and control means for admitting a hydraulic or pneumatic pressure fluid into the upper chamber 50a of the cylinder 50 so as to move the piston 51 against the bias of the spring 53 and to pivot the valve member 36a to its fully open position. The control means comprises a source of pressure fluid in the form of a reservoir 54, a supply conduit 55 which connects the reservoir with a solenoid-operated valve 56 and which contains a source of pressure in the form of a liquid pump 57, a conduit 58 which connects the valve 56 with the upper chamber 50a of the cylinder 50, a return conduit 59 which directly connects the valve 56 with the reservoir 54, and a solenoid 37a' which is operatively connected with the valve 56 and which is also connected with a relay and with a thermoelement such as the parts 42, 43 shown in FIG. 6.

In response to a predetermined temperature in the corresponding zone of the extrusion cylinder, the solenoid 37a' operates the valve 56 so that pressure fluid may flow from the pressure side of the pump 57 through the conduit 58 and to the cylinder chamber 50a whereby the valve member 36a is moved to its fully open position in which it permits unimpeded flow of coolant from the tank 27 to the duct 26a and to the corresponding group of channels in the periphery of the extrusion cylinder. When the valve member 36a is closed, the pressure fluid drawn by the pump 57 is merely recirculated through the valve 56 and the return conduit 58. The valve 56 then connects the conduit 58 with the conduit 59 so that the spring 53 may expel fluid from the cylinder chamber 50a.

Of course, if the blower 31 is replaced by the fan 31' of FIG. 12, the flow of coolant in the duct 26a is reversed. It will be readily understood that the source 54 of liquid pressure fluid may be replaced by a source of compressed air, i.e. the servomotor 50–53 may be of the pneumatic type if desired.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be protected by Letters Patent is:

1. A machine for transforming a plastic material into an extruded article, said machine comprising, in combination, an elongated extrusion cylinder having a longitudinal axis and comprising material admitting means at one end thereof, extrusion die means at the other end thereof, and at least two groups of external annular fins disposed intermediate said material admitting means and said die means and located in planes substantially perpendicular to said axis; a plurality of heating means each disposed about and defining with one of said groups of fins a plurality of separate arcuate channels each having an intake and an outlet angularly spaced from said intake by substantially less than 360 degrees; and a cooling arrangement comprising a single coolant receiving tank and means for conveying coolant separately from said coolant receiving tank to the intakes of channels defined by each of said groups of fins whereby stream of coolant flow through said channels in planes perpendicular to said axis and are discharged through said outlets after intensive and short-lasting exchange of heat with the corresponding portions of the cylinder and the heating means.

2. A machine for transforming a plastic material into an extruded article, said machine comprising in combination, an elongated extrusion cylinder having a longitudinal extension and a transverse extension which is perpendicular to said longitudinal extension, said cylinder comprising material admitting means at one end thereof, extrusion die means at the other end thereof, and at least two groups of external fins disposed intermediate said material admitting means and said die means and located in planes parallel with one of said extensions; a plurality of heating means disposed about selected zones of said cylinder and each defining with one of said groups of fins a plurality of separate channels each having an intake and an outlet spaced from the respective intake; and a cooling arrangement comprising a coolant receiving tank, means for separately conveying coolant from said tank to the intakes of channels defined by each of said groups of fins whereby the coolant flows through said channels in planes parallel with said one extension and is discharged through the respective outlets, means for introducing a continuous stream of gaseous coolant into said tank at a rate at least equal to the rate at which coolant is conveyed from the tank when each of said channels receives coolant, valve means for permitting escape of coolant in response to a predetermined pressure in said tank, and means responsive to temperatures prevailing in the respective zones of said cylinder for regulating the flow of coolant from said tank to said conveying means.

3. A machine for transforming a plastic material into an extruded article, said machine comprising, in combination, an elongated extrusion cylinder having a longitudinal extension and a transverse extension which is perpendicular to said longitudinal extension, said cylinder comprising material admitting means at one end thereof, extrusion die means at the other end thereof, and at least two groups of external fins disposed intermediate said material admitting means and said die means and located in planes parallel with one of said extensions; a plurality of heating means disposed about selected zones of said cylinder and each defining with one of said groups of fins a plurality of separate comparatively short channels each having an intake and an outlet spaced from the respective intake; and a cooling arrangement comprising a single source of gaseous coolant including a tank with a capacity sufficient to deliver coolant simultaneously to all of said channels and means for conveying coolant from said tank to the intakes of all of said channels whereby the coolant flows through said channels in planes parallel with said one extension and is discharged through the respective outlets.

4. A machine for transforming a plastic material into an extruded article, said machine comprising, in combination, an elongated extrusion cylinder having a longitudinal extension and a transverse extension which is perpendicular to said longitudinal extension, said cylinder comprising material admitting means at one end thereof, extrusion die means at the other end thereof, and at least two groups of external fins disposed intermediate said material admitting means and said die means and located in planes parallel with one of said extensions; a plurality of heating means disposed about selected zones of said cylinder and each defining with one of said groups of fins a plurality of separate channels each having an intake and an outlet spaced from the respective intake; and a cooling arrangement comprising a substantially cylindrical tank having a pair of spaced end walls, a blower adjacent to an opening formed in one of said end walls for drawing air into said tank, an adjustable valve provided in the other end wall for permitting discharge of air from said tank in response to a predetermined pressure prevailing in the tank, and means communicating with said tank for separately conveying air to the intakes of all of the channels defined by each of said groups of fins whereby the air flows through said channels in planes parallel with said one extension and discharged through the respective outlets.

5. A machine for transforming a plastic material into an extruded article, said machine comprising, in combination, an elongated extrusion cylinder having a longitudinal axis and comprising material admitting means at one end thereof, extrusion die means at the other end thereof, and at least two groups of external axially parallel fins disposed intermediate said material admitting means and said die means; a plurality of tubular heating means, at least one for each of said groups, each heating means surrounding and defining with the respective group of fins a plurality of separate channels having intakes at one axial end of the respective heating means and outlets at the other axial end of the respective heating means; and a cooling arrangement comprising a single source of gaseous coolant and means for separately conveying coolant from said source to the intakes of channels defined by the respective heating means whereby the coolant flows through the channels in the axial direction of said cylinder and is discharged through the respective outlets, each of said conveying means comprising a substantially annular hood surrounding the cylinder and communicating with the intakes of the channels defined by the respective heating means and communicating with said source, the axial length of each hood diminishing gradually from said supply duct to the diametrically opposite side of said cylinder at a rate insuring uniform distribution of coolant to each of said channels.

6. A machine for transforming a plastic material into an extruded article, said machine comprising, in combination, an elongated extrusion cylinder having a longitudinal extension and a transverse extension perpendicular to said longitudinal extension; means for admitting plastic material to one end of said cylinder; extrusion die means at the other end of said cylinder; a plurality of heating means each thereof partially surrounding said cylinder intermediate said material admitting means and said die means and each thereof defining with said cylinder a plurality of separate channels extending in planes parallel with one of said extensions; a single coolant receiving tank; and means for conveying gaseous coolant from said tank to each of said channels whereby the coolant flows through said separate channels in planes parallel with one of said extensions.

7. A machine for transforming a plastic material into an extruded article, said machine comprising, in combination, an elongated extrusion cylinder having a longitudinal axis and formed with at least two groups of external annular fins disposed in planes substantially perpendicular to said axis; means for admitting plastic material to one end of said cylinder; extrusion die means at the other end of said cylinder; a plurality of tubular heating means surrounding said cylinder and each defining with one of said groups of fins a plurality of separate cooling channels, each of said heating means formed with intakes and outlets for respectively admitting coolant to and for withdrawing coolant from said channels, said intakes and said outlets of each of said heating means being disposed at diametrically opposite sides of said cylinder; a single coolant receiving tank; and means for conveying gaseous coolant from said tank separately to each group of said intakes whereby the coolant flows through said separate channels in planes perpendicular to the axis of said cylinder and is discharged through said outlets.

8. A machine for transforming a plastic material into an extruded article, said machine comprising, in combination, an elongated extrusion cylinder having a longitudinal extension and a transverse extension which is perpendicular to said longitudinal extension, said cylinder comprising material admitting means at one end thereof, extrusion die means at the other end thereof and at least two groups of external fins disposed intermediate said material admitting means and said die means and located in planes parallel with one of said extensions; a plurality of heating means disposed about selected zones of said cylinder and each defining with one of said groups of fins a plurality of separate channels each having an intake and an outlet spaced from the respective intake; and a cooling arrangement comprising a source of gaseous coolant including a coolant receiving tank, means for introducing a continuous stream of gaseous coolant into said tank, valve means for permitting escape of coolant in response to a predetermined pressure in said tank, means for separately conveying coolant from said tank to the intakes of channels defined by each of said groups of fins whereby the coolant flows through said channels in planes parallel with said one extension and is discharged through the respective outlets, and means responsive to temperatures prevailing in the respective zones of said cylinder for regulating the flow of coolant from said tank to said conveying means, said temperature responsive means comprising solenoid operated valve means mounted in each of said conveying means and each normally assuming one of two positions including a fully open position and a closed position, a thermoelement mounted in said cylinder adjacent to each of said groups of fins, and relay means connected in circuit with said thermoelement, with the respective heating means and with said solenoid operated valve means for completing the circuit of the heating means in response to a drop in temperature prevailing in the cylinder and for opening said solenoid operated valve means in response to a rise in temperature prevailing in said cylinder.

9. A machine for transforming a plastic material into an extruded article, comprising an elongated extrusion cylinder having a longitudinal extension and a transverse extension which is perpendicular to said longitudinal extension, said cylinder having material admitting means at one end thereof, extrusion die means at the other end thereof, and external fins disposed intermediate said material admitting means and said die means and located in planes parallel with one of said extensions; heating means disposed about and defining with said fins a plurality of separate channels each having an intake and an outlet spaced from the respective intake; and a cooling arrangement comprising a source of gaseous coolant and means for conveying gaseous coolant from said source to said intakes whereby the coolant flows through said channels in planes parallel with said one extension and is discharged through said outlets, said conveying means comprising a supply duct and a hood communicating with the intakes of the channels and with said duct, the cross-sectional area of said hood diminishing gradually from the intakes nearest said supply duct to those spaced therefrom, whereby coolant is uniformly distributed to each of said channels.

References Cited by the Examiner

UNITED STATES PATENTS

| | | | |
|---|---|---|---|
| 1,339,374 | 5/20 | Buensod | 165—20 |
| 2,093,936 | 9/37 | Spielmann | 165—20 |
| 2,411,971 | 12/46 | MacMillin et al. | 18—12 |
| 2,433,936 | 1/48 | Tornberg | 18—12 |
| 2,541,201 | 2/51 | Buecken et al. | 18—12 XR |
| 2,640,033 | 5/53 | Marshall | 18—12 |
| 2,774,107 | 12/56 | Davis | 18—12 |
| 2,893,055 | 7/59 | Wenzel. | |
| 2,904,664 | 9/59 | Rothacker. | |
| 2,970,341 | 2/61 | Mallory et al. | 18—12 |
| 3,001,233 | 9/61 | Ernst | 18—12 XR |
| 3,055,053 | 9/62 | Livingston | 18—12 |

FOREIGN PATENTS

| | | |
|---|---|---|
| 826,008 | 12/59 | Great Britain. |
| 828,083 | 2/60 | Great Britain. |

MICHAEL V. BRINDISI, *Primary Examiner.*

WILLIAM J. STEPHENSON, ROBERT F. WHITE, *Examiners.*